United States Patent [19]

Hakamatsuka et al.

[11] Patent Number: 5,410,642
[45] Date of Patent: Apr. 25, 1995

[54] ID CARD ISSUING SYSTEM

[75] Inventors: Miyuki Hakamatsuka; Yoshihisa Ashida; Akiyoshi Sagara; Katsuyuki Ohshima; Jitsuhiko Andoh; Michio Kurata; Tetsuo Irita, all of Tokyo, Japan

[73] Assignee: Dai Nippon Printing Co., Ltd., Tokyo, Japan

[21] Appl. No.: 188,367

[22] Filed: Jan. 26, 1994

Related U.S. Application Data

[63] Continuation of Ser. No. 674,340, Apr. 23, 1991, abandoned.

[30] Foreign Application Priority Data

| Aug. 23, 1989 | [JP] | Japan | 1-217117 |
| Dec. 25, 1989 | [JP] | Japan | 1-149044 U |
| Dec. 25, 1989 | [JP] | Japan | 1-335745 |
| Apr. 10, 1990 | [JP] | Japan | 2-94795 |

[51] Int. Cl.[6] ............................. G06F 15/00
[52] U.S. Cl. ............................. 395/113; 395/106
[58] Field of Search ............ 395/101, 113, 106, 117, 395/112, 144, 146, 148, 161; 283/107-112, 74, 75, 77; 382/58, 2, 61; 381/56-61; 428/200, 211; 380/59; 346/154; 354/109; 358/450, 462; 355/40

[56] References Cited

U.S. PATENT DOCUMENTS

| 4,592,946 | 6/1986 | Shuman | 428/200 |
| 4,712,909 | 12/1987 | Oshikoshi | 355/40 |
| 4,768,811 | 9/1988 | Oshikoshi et al. | 238/107 |
| 5,038,392 | 8/1991 | Morris et al. | 382/61 |
| 5,146,548 | 9/1992 | Bijnagte | 395/117 |

FOREIGN PATENT DOCUMENTS 63-197293 8/1988 Japan.

Primary Examiner—Arthur G. Evans
Attorney, Agent, or Firm—Dellett and Walters

[57] ABSTRACT

A plurality of different kinds of information, for example, full-color photographic image information and attribute information such as a name, date of birth, etc., are input by use of a CCD scanner (1a), a camera (1b), a keyboard (1c), a mouse (1d), etc., with coordinate information assigned to each piece of information. The input pieces of information are matched with each other with reference to the coordinate information, and an arrangement of the coordinated information is determined with reference to layout information prepared separately, and then the information is printed out onto a card substrate. Thus, an ID card can be made accurately and efficiently. In addition, forgery prevention processing is applied by simultaneously inputting forgery prevention information and further falsification prevention processing is applied by carrying out emboss processing, thereby enabling an improvement in the security of the ID card.

In addition, it is possible to prevent the making of forged cards and the undesired issue of cards which are not conformable to a particular production purpose by adding a special pattern (113) to a blank card (110) and applying print processing thereto after recognizing the special pattern by a card processing machine (112).

40 Claims, 16 Drawing Sheets

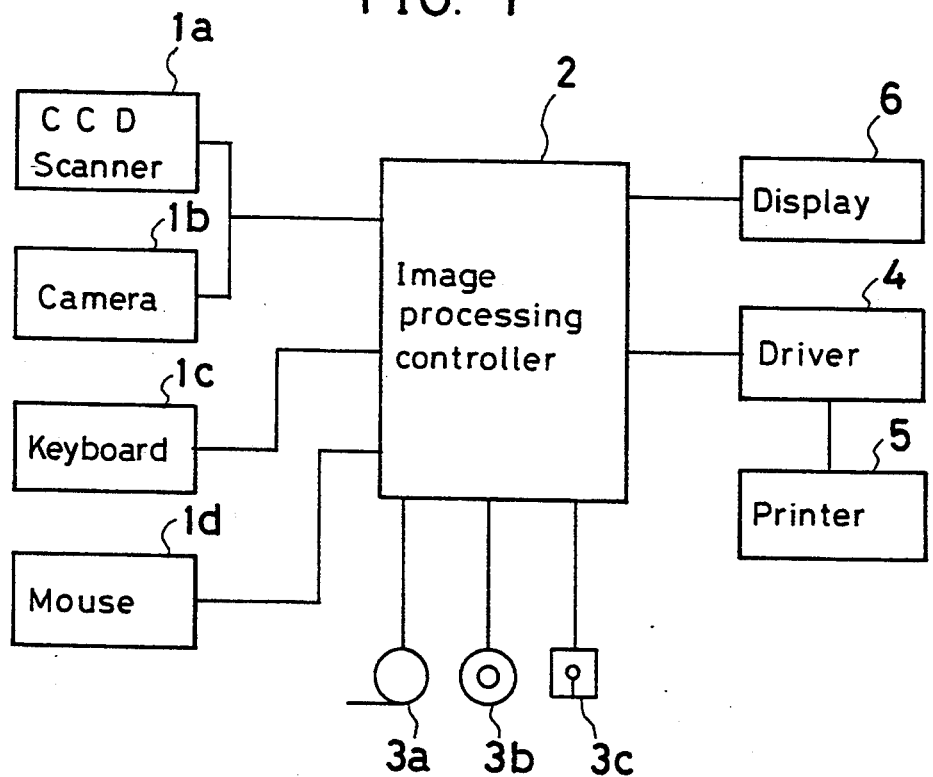

| | Position | | Size | | Character spacing | Kind of character | Character size |
|---|---|---|---|---|---|---|---|
| | X | Y | Length | Breadth | | | |
| A | X1 | Y1 | L1 | T1 | D1 | C1 | S1 |
| B | X2 | Y2 | L2 | T2 | D2 | C2 | S2 |
| a | X3 | Y3 | L3 | T3 | — | — | — |
| b | X4 | Y4 | L4 | T4 | — | — | — |

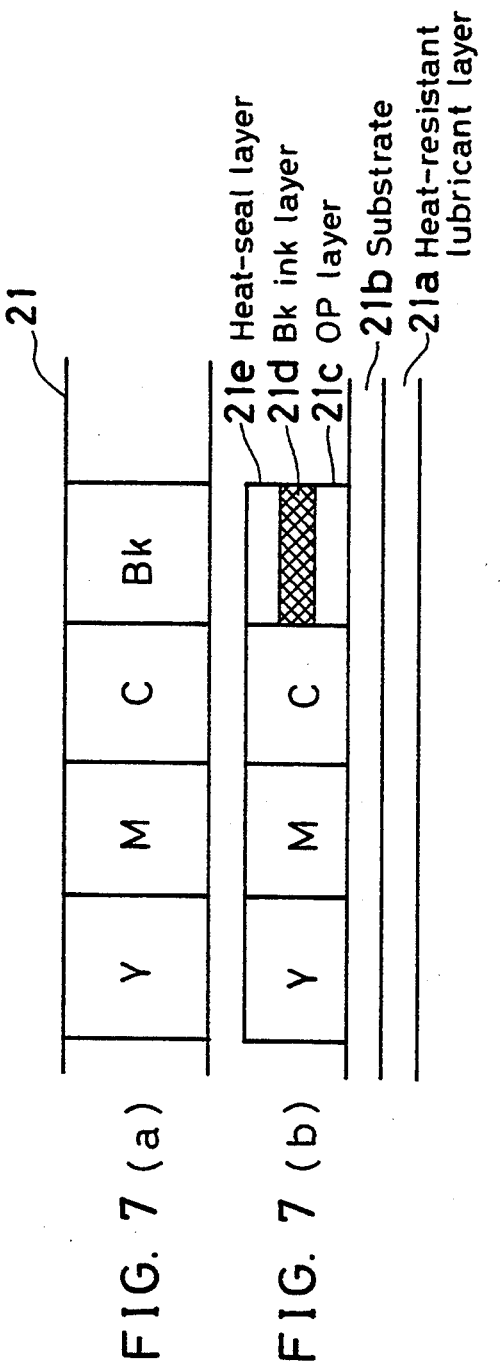

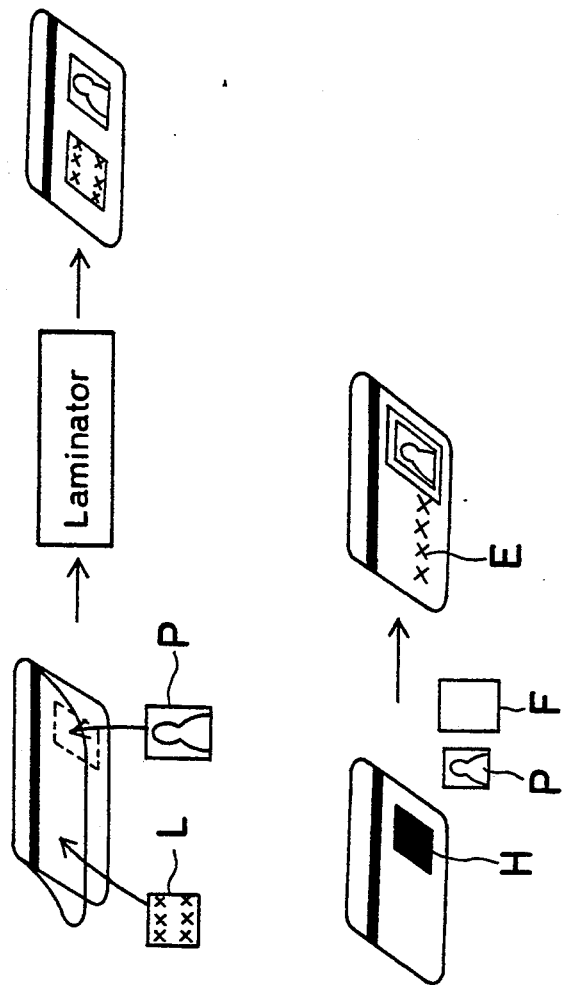
FIG. 23 (A) PRIOR ART
FIG. 23 (B) PRIOR ART

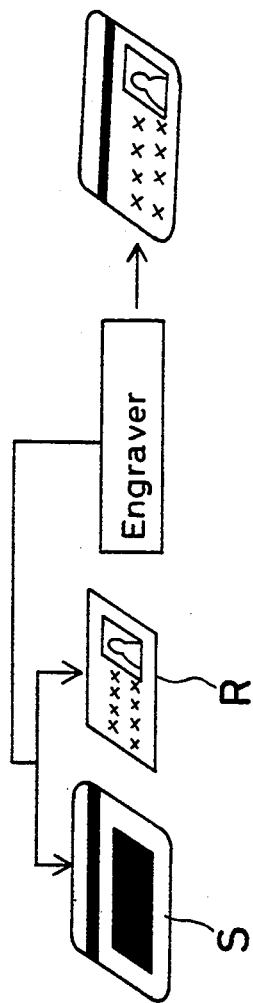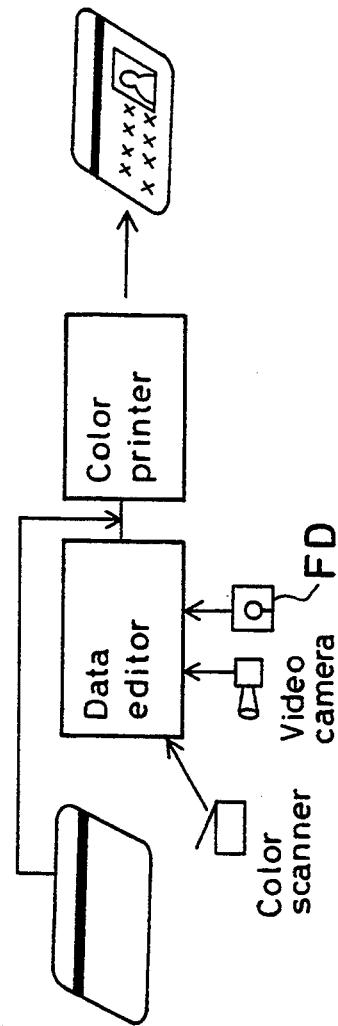
FIG. 23 (C) PRIOR ART
FIG. 23 (D) PRIOR ART

ID CARD ISSUING SYSTEM

This is a continuation of application Ser. No. 07/674,340, filed on Apr. 23, 1991 now abandoned.

TECHNICAL FIELD

The present invention relates to an ID card issuing system which is capable of printing full-color images and of performing a smooth card issuing operation. The present invention further relates to an ID card issuing system which is capable of subjecting ID cards to falsification and forgery prevention processing and of reliably preventing forgery or mixing of information when various kinds of card are made by printing blank cards.

BACKGROUND ART

Hitherto, various kinds of ID card have been issued and used in various fields. Since these cards are closely related to the transaction of money, it is essential to improve safety in the use of the cards. For this reason, various countermeasures have been taken, for example, the adoption of code number system for the identification of each individual user, the verification of fingerprints, the introduction of identification photographs, etc. Among these, the introduction of identification photographs is superior in terms of human interface and cost, and ID cards with identification photographs buried therein have been made. However, this type of ID card involves a manual operation and hence needs much time for the making thereof.

To cope with this problem, the following proposals have heretofore been made:

(1) A user's portrait is photographed with a video camera, together with symbols, for example, the user's name, and these images are synthesized and recorded by means of a video printer to thereby make an ID card with the user's portrait and his/her name or the like recorded thereon (see Japanese Patent Laid-Open (KOKAI) No. 63-71399).

(2) A part of a card is provided with a single dye recording layer containing a polyester resin material and a thermosetting resin material, and an ink film having a dye layer formed thereon by successively coating it with a plurality of heat-migratory dyes of different colors is attached to the dye recording layer using pressure with a thermal head, thereby recording a full-color image on the card (see Japanese Patent Laid-Open (KOKAI) No. 64-4368).

(3) The transfer film used is judged to be a sublimation transfer film or a thermal transfer film, and the quantity of energy applied by a thermal head is controlled in accordance with the kind of transfer film, thereby enabling a single recording apparatus to effect recording with both a sublimation dye and a fused ink (see Japanese Patent Laid-Open (KOKAI) 63-296966).

However, the prior art (1) is adapted for black and white images and cannot meet the recently increasing demand for full-color identification photographs. In the prior art (2), although color identification photographs are available, it only discloses the formation of cards with color images and cannot meet delicate demands in the making of ID cards, such as a demand for the making of a color ID card with a full-color identification photograph and a black and white image of the user's name or other symbols. The prior art (3) only discloses the technique by which sublimation transfer that is suitable for gradation expression and thermal transfer that is suitable for black and white expression are effected by use of a single recording apparatus, but it discloses no specific method of applying the technique to an object such as an ID card. Such a method has heretofore been difficult to realize.

When there are a large amount of data about images such as identification photographs and data about the attributes of each individual, it is desired to be capable of joining together each individual and his/her identification photograph accurately and printing out these data efficiently to issue ID cards. However, no technique has yet been developed to meet such request.

Further, since no forgery prevention measures are taken to conventional ID card issuing systems, there is a danger that ID cards may be forged. It is necessary in order to adopt a forgery prevention measure to carry out some forgery prevention processing as a post-processing that is carried out after an image has been output onto a card substrate, and this additional processing lengthens the time needed for the making of ID cards, resulting in a rise in the cost.

In addition, paper ID cards are generally used, for example, an identification card that is formed by attaching a photograph to a sheet of paper and writing thereon attribute data, e.g., name, employee number, etc. In the case of such paper ID cards, a tally seal is finally put on each card thus prepared as the issuer's acknowledgment seal to prevent falsification.

These days, however, it is general practice to form all kinds of card into plastic cards as seen in cash cards, credit cards, etc., so that when cards for various kinds of identification or certificate, which have heretofore been made of paper, are formed into plastic cards, it becomes impossible to put an acknowledgment seal as a tally seal, as in the case of the conventional paper cards, because of the differences in thickness, material and so forth. Accordingly, such plastic cards with identification photographs but no tally seal have no falsification prevention processing taken thereto after the identification photograph processing. Therefore, if such a plastic card is falsified by replacing the identification photograph with another, it may be impossible to identify this card as a falsified one.

ID cards which are spread in the form of membership cards, cash cards, credit cards, etc. may be roughly divided into two types: one in which the material, shape and so forth are not restricted, and the other in which the external dimension, structure, etc. are strictly specified so that interchangeability is available for various kinds of card processing apparatus, as in the case of magnetic cards, IC cards, etc. Items that are specified in regard to credit cards, for example, include the material, shape, dimensions and physical properties of cards, the position, shape and dimensions of embossed characters, the position, shape, dimensions and physical properties of magnetic stripes, and so forth. In actuality, such ID cards are issued by printing image data, e.g., a pattern, identification photograph, etc., and attribute data, e.g., an embossed pattern, name label, etc. on blank cards by use of a card processing machine.

FIGS. 23(A) to 23(D) illustrate conventional ID card issuing methods, respectively. In the case of FIG. 23(A), an identification photograph P and a name label L are set at predetermined positions, respectively, on a blank card, and this card is processed by means of a commercially available laminator, thereby issuing an ID card in a simple way. In the case of FIG. 23(B), after an identification photograph P is fitted in and stuck to a recess H provided in the surface of a blank card by a manual operation, this identification photograph P is sealed with a covering film F to protect it, and subsequently attribute data, e.g., an embossed pattern E, name label L, etc., is recorded on the card. In the case of FIG. 23(C), with an original R for a blank card prepared in advance, data is engraved on a sculpture area S of the card body by use of an engraver at the same time as the original R is read, thereby reproducing on the card the same photograph and/or character data as those on the original. Further, in the example shown in FIG. 23(D), an identification photograph P or the like, which is to be reproduced, is input through a video camera or a scanner in advance, while character data, e.g., attribute information T, is also prepared and stored in a floppy disk or the like, and the image data and the attribute data are processed by use of a data editor comprising a personal computer serving as a main component, interface means, etc., and then output onto a blank card by a color printer.

The issuing methods shown in FIGS. 23(A) and 23(B) are suitable for ID cards such as membership cards, for which restrictions are not-strict in comparison to other type of ID card, while the issuing methods shown in FIGS. 23(C) and 23(D) are employed to make ID cards such as various kinds of cash card and credit card, which need to conform to the specifications.

In the case of the issuing methods shown in FIGS. 23(A) and 23(B), in which processing is carried out in a simple way, there are no strict restrictions on the material, shape and so forth of blank cards themselves, and for this reason these methods have the shortcoming that a forged card is readily made simply by changing the identification photograph or altering the print of attribute data. The issuing methods shown in FIGS. 23(C) and 23(D), which involve strict restrictions on blank cards themselves, also suffer from the disadvantage that as long as the specifications for the shape, material, etc. of blank cards are met, even cards which are different from normal ones in design or lot, for example, are undesirably printed by the card processing machine without being discriminated from the correct ones. For this reason, there is a danger that cards which are not conformable to the purpose of the production may be undesirably issued without permission, and no prevention measures can be taken in regard to such undesired issuing of cards in the present state of art.

The present invention aims at solving the above-described problems.

It is an object of the present invention to provide an ID card issuing system which is capable of accurately matching a plurality of pieces of information and of recording full-color images with high mass-productivity.

It is another object of the present invention to reduce loss of time and cost due to the forgery prevention processing and to issue ID cards of high security.

It is still another object of the present invention to prevent the falsification of a card with an identification photograph attached thereto.

It is a further object of the present invention to prevent the making of forged cards and the undesired issue of cards which are not conformable to the production purpose.

SUMMARY OF THE INVENTION

The present invention is characterized by comprising means for inputting a plurality of different kinds of information, means for coordinating the input different kinds of information with each other, layout means for determining an arrangement of the coordinated information, and means for outputting the laid-out information onto a card substrate.

In addition, the present invention provides an ID card issuing system in which identification photograph information, attribute information and layout information are input to an image processing means to execute image processing and edited image information is output onto a card substrate, characterized in that forgery prevention information is input to the image processing means, together with the identification photograph information, attribute information and layout information, to execute image processing, and forgery prevention processing is executed at the same time as the image information is output.

In addition, the present invention is characterized in that emboss processing is applied to an identification photograph mounted on a card or over the identification photograph and the card substrate.

In addition, the present invention is characterized in that a special pattern is pre-printed on a blank card before image data or attribute data is printed thereon, the special pattern differing for each lot, and the blank card is judged by a card processing machine which effects recognition for each special pattern according to a specifying code set therefor, so that when the blank card is judged to be good, image data or attribute data is printed out thereonto.

BRIEF DESCRIPTION OF DRAWINGS

FIG. 1 shows the arrangement of an ID card issuing system according to the present invention;

FIGS. 2a & 2b show data structures;

FIGS. 7 and 8 show the arrangement of a transfer film;

FIGS. 23a, 23b, 23c & 23d illustrate conventional ID card issuing systems.

DETAILED DESCRIPTION OF THE INVENTION

Figure 3A:
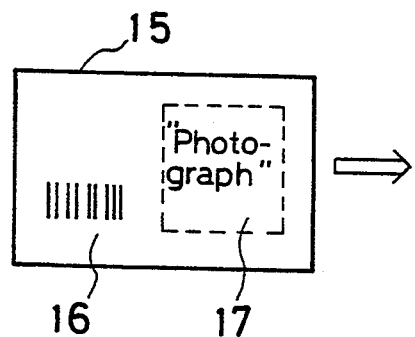
FIGS. 3(a)-(b) illustrates the way of making a photograph mount.
Figure 3B:
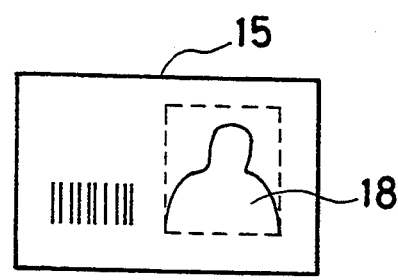
Figure 4A:
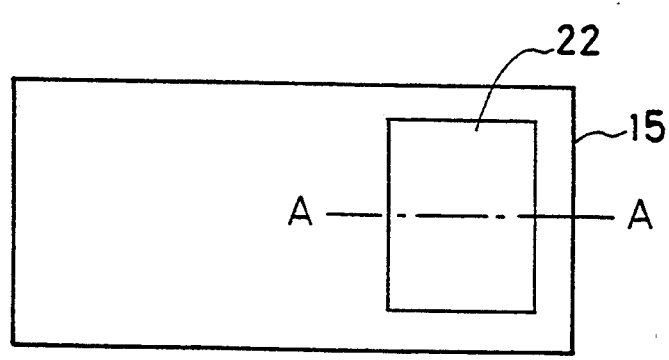
FIGS. 4a & 4b illustrate the photograph mount.
Figure 4B:
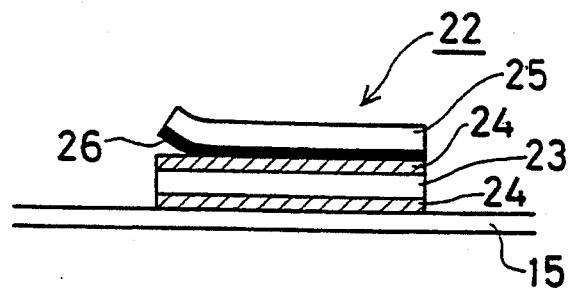

FIG. 1 shows the arrangement of an ID card issuing system according to the present invention; FIGS. 2(a)-(b) show data structures; FIGS. 3(a)-(b) illustrate the way of making a photograph mount; FIGS. 4(a)-(b) illustrates a layout processing; FIGS. 5(a)-(b) and 6(a)-(b) show the arrangement of a transfer film; and FIGS. 7(a)-(b) illustrates the arrangement of a printer. In these figures, reference numeral 1a denotes a CCD scanner, 1b a camera, 1c a keyboard, 1d a mouse, 2 an image processing controller, 3a a magnetic tape, 3b an image memory, 3c a floppy disk, 4 a driver, 5 a printer, 6 a display, 7 a bar code reader, 8 a video camera, 9 a scanner read head, 11 and 14 ID cards, 12 an emboss encoder, 13 a magnetic tape, 15 a photograph mount, 16 a bar code, 17 a photograph mount region, 18 a mounted photograph, 21 a transfer film, 23 a base, 24 an adhesive layer, 25 a base, 26 a release layer, 31 to 35 heads, 35 a card, and 37 a carriage.

Referring to FIG. 1, pieces of attribute data, for example, the name, employee number, address, telephone number, etc. of each individual, are input either by directly inputting them by use of a keyboard, or by reading data from a floppy disk, magnetic tape, etc. if such attribute data has previously been stored therein. In addition, coordinate information (i.e., a number that specifies each individual) is assigned to data for each individual, thereby preparing a file composed of attribute data such as that shown in FIG. 2(a), which is stored in the magnetic tape 3a, the image memory 3b and/or the floppy disk 3c according to need. The image memory 3b comprises a large-capacity recording device such as a magnetic disk, optical disk, magnet-optical disk, etc. By so doing, the attribute data can be reused according to need.

In the meantime, the above-described coordinate information that is assigned to each individual is printed in the form of a bar code 16 on a sheet of plain paper by use, for example, of a thermal transfer printer, ink-jet printer or the like, thereby making a photograph mount 15 formed with a photograph mount region. It should be noted that the print pattern corresponding to the coordinate information is not necessarily limited to the bar code and that any pattern that is readable by an OCR (Optical Character Reader, OMR (Optical Mark Reader), etc. may be employed.

Next, a photograph 18 is stuck to the photograph mount region 17, as shown in FIG. 3(b). This is done by sticking the photograph 18 to a strip of tack paper (adhesive paper) 22 which has previously been bonded to the photograph mount region 17 of the mount 15, as shown in FIGS. 4(a)-(b). As shown in FIG. 4(b) (a sectional view taken along the line A—A of FIG. 4(a)), the tack paper 22 has a structure that comprises a base 23, a pair of adjesive layers 24a and 24b that are provided on both sides, respectively, of the base 2, and a base 25 formed with a release layer 26, the base 25 being laminated on the adhesive layer 24a. With the tack paper 22 bonded to the mount 15 at the adhesive layer 24b, the base 25 is separated through the release layer 26 to expose the adhesive layer 24a, onto which the photograph is stuck. By so doing, the mount need not be formed with a recess and it is therefore possible to ensure the strength required for the mount. In addition, since the photograph can be stuck by pulling off the base 25 that is a part raised from the mount, the operability is excellent, and since no paste is used, there is no possibility that the mount and/or the photograph may be distorted.

The mount 15 having the photograph stuck thereto in this way is photographed by a CCD scanner 1a, which is a plane scanning image input device, or a camera 1b, e.g., a TV camera, electronic still camera, etc., shown in FIG. 1, thereby inputting the printed photographic information. In this case, a specific area of the photograph is taken, but it is also possible to arrange the system such that left and right cropping positions of the person's image with respect to the center line thereof are automatically determined by providing a function of obtaining the center line of the person's image in the photographic information, a function of obtaining the top point of the person's image, a function of obtaining the bottom edge of the portrait, etc.

Figure 5A:
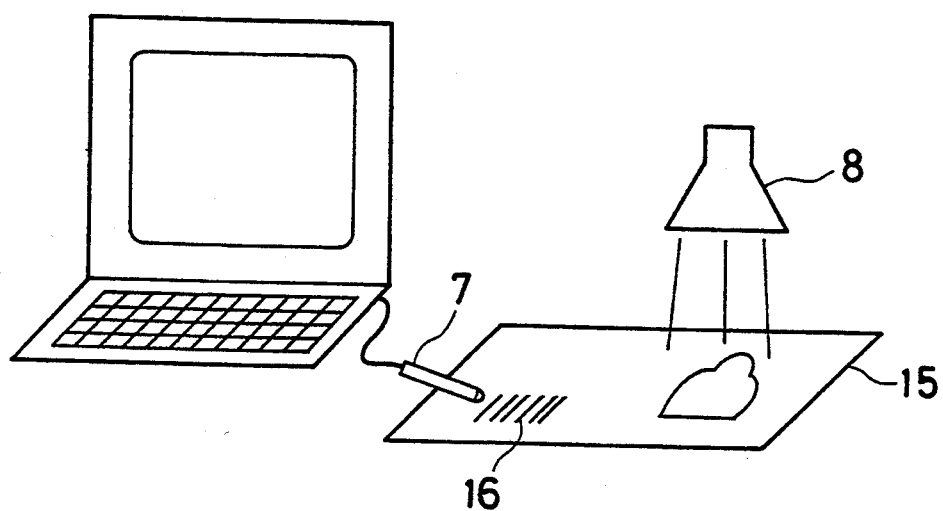
FIGS. 5a & 5b illustrate an image reading method.
Figure 5B:
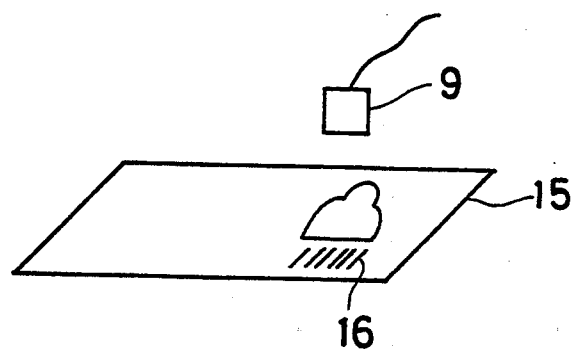

It is also possible to photograph the picture with a camera 8 and read the bar code 16 with a bar code reader 7, as shown in FIG. 5(a). Alternatively, the photograph and the bar code may be read simultaneously by use of a scanner head 9, for example, as shown in FIG. 5(b).

The image data and bar code thus read are formed into a data file and stored, as shown in FIG. 2(b), so that these data can be reused in the same way as in the case of the attribute data.

A handwritten signature is an image with gradation since the density varies with the pressure that a writer puts on the pen, and it may be taken in as image data in the same way as in the case of the photographic image, if necessary. In addition, a logo mark and the like may also be taken in as image data.

The photographic image data that is taken in is not necessarily limited to the one that is stuck to a photograph mount, and it is also possible to take in data by photographing an individual directly. It is also possible to take in data through a plurality of photographing devices, as a matter of course. In addition, it is also possible to take a picture at a remote place by use of a photographic image taking device which is cut off from the system, store the image data on an optical disk or the like, and read the data from the disk to the system.

Then, code information such as the name, employee number, etc. of each individual is read out from the attribute data file shown in FIG. 2(a), while photographic information is read out from the photographic image data file shown in FIG. 2(b), and the pieces of coordinate information that are assigned to the attribute data and the photographic image data are checked against each other, thereby matching the code information and the photographic information, and thus coordinating these two pieces of information with each other.

Since this coordinating processing only requires to read out attribute data and image data which have the same coordinate information and join them together, it may be carried out in any desired order and it can also cope flexibly with various occasions whether a single or plurality of individuals. In addition, since pieces of data which have the same coordinate information are joined together, even a large amount of data can be processed accurately and efficiently. Each set of coordinated image and attribute data is properly stored in the form of a data file on an optical disk or the like so that it can be reused.

Next, layout processing is executed to determine an arrangement in which characters and a photograph are to be printed out onto a card.

Figures 6A, 6B:
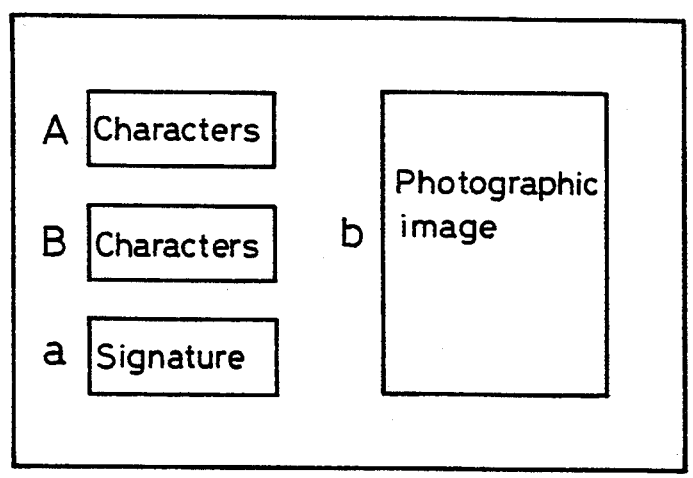
FIGS. 6a & 6b illustrate layout processing.

This layout processing is executed with reference to layout information such as that shown exemplarily in FIG. 6(a). More specifically, assuming that items A and B are characters, while an item a is a handwritten signature and an item b is a photographic image, positional information (X, Y) and sizes (length and breadth) are set therein, respectively. As for character data, a kind, size and spacing of characters are set, and on the basis of these set values, a layout such as that shown exemplarily in FIG. 6(b) is determined.

After the determination of a layout, the photographic image data and the attribute data are printed out onto a blank card prepared separately. If, at this time, gradational images such as a photograph and a handwritten signature are printed out by the sublimation transfer method, while non-gradational images such as a name and a bar code are printed out by the thermal transfer method, printing that makes use of the properties of the two transfer methods can be realized. More specifically, bar code readers and OCRs, which detect information by use of infrared rays, need bar codes and character information to cause infrared absorption, while for recording of gradational images the sublimation transfer method is suitable since the density smoothly varies with the heat energy; however, the infrared absorption is small in this method because of the use of dyes. On the other hand, the thermal transfer method, although binary expression, enables the required infrared absorption characteristics because it uses pigments. For these reasons, gradational images such as photographs are printed out by the sublimation transfer method, thereby enabling recording that is suitable for visual observation, whereas non-gradational images such as names, bar codes, etc., are printed out by the thermal transfer method, thereby enabling recording which is suitable for reading by machines. If the bar code reader and OCR are also sensitive to dyes, the two different kinds of data may be printed out by the sublimation transfer method only, in which case the system can be simplified. Further, by adding an infrared absorbing dye to the sublimation dye layer, it is possible to improve the detection sensitivity of the OCR sensor and expand the wavelength selection range thereof. Examples of infrared absorbing dyes usable in the present invention are azo, nonacyanin and squalene dyes. It is a matter of course that printing may be effected by the thermal transfer method only, if necessary.

If a large number of cards are to be issued, a plurality of printers may be installed for printing, and in such a case, all of them may be sublimation transfer printers. Alternatively, the arrangement may be such that sublimation transfer printers are used for image information, and thermal transfer printers for code information.

In addition, photographic information may be recorded in the form of an enlarged or reduced image by image processing.

Figure 8:
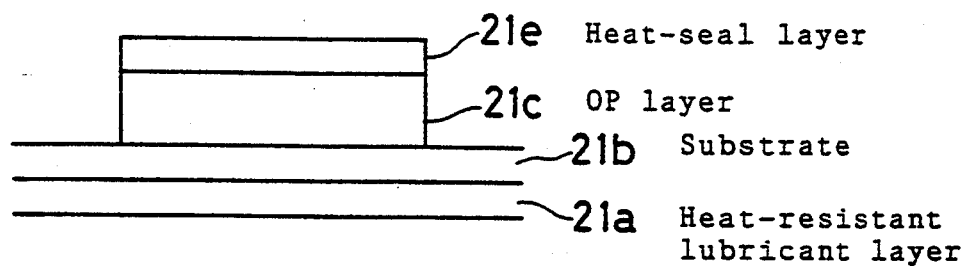

The transfer film that is used in the present invention is a frame-sequential transfer film 21 with sublimation transfer ink regions Y, M and C and a thermal transfer ink region Bk, as shown exemplarily in FIGS. 7(a)-(b). Although the example shown in FIGS. 5(a)-(b) has an overprint (OP) layer provided in the thermal transfer ink region of the transfer film to provide a protective film over the code information recording region by use of it, it is also possible to provide an OP layer independently so as to form a protective film over the whole surface of the card or any desired region, e.g., the image information (photographic) region, the code information region, etc., as shown in FIG. 8. If both image information and code information are transferred by the sublimation transfer method, a sublimation transfer ink region Bk is used in place of the thermal transfer ink region Bk.

Figure 9A:
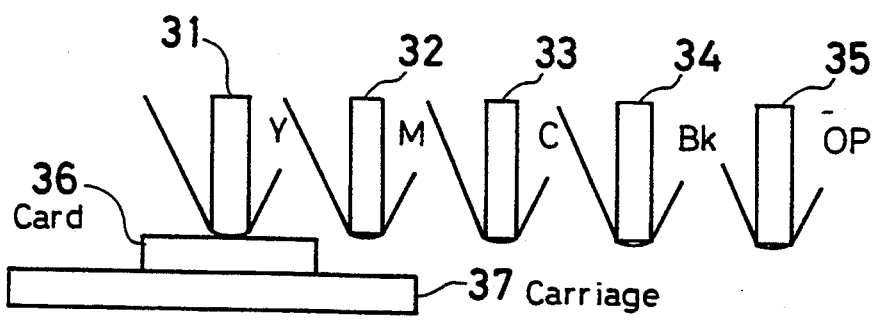
FIGS. 9a, 9b & 9c illustrate the arrangement of a printer.

In the case of mass-production recording, each card 36 that is conveyed on a carriage 37 is subjected to recording by either the sublimation or thermal transfer method with a multihead arrangement comprising 4 or 5 heads, as shown in FIG. 9(a). In this case, the transfer film is processed by independent heads 31 to 35 which are used for Y, M, C, Bk and OP, respectively. The speed is on the order of 4 seconds per card, and each head has 12 elements per mm. It should be noted that OP may be recorded by another printer.

Figure 9B:
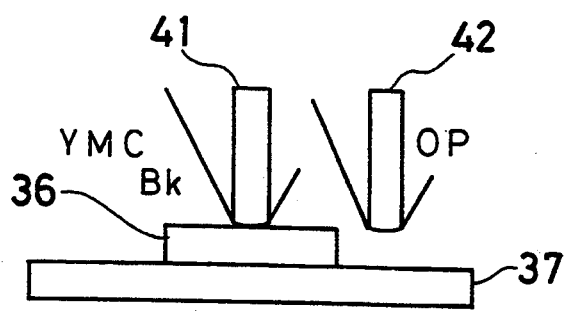

In the case of a simple system, Y, M, C and Bk are printed with a single head 41, and OP with another head 42, as shown in FIG. 9(b). The speed is 8 to 12 seconds per card, and each head has 12 elements per mm. Y, M, C and Bk are successively printed by reciprocating motion of the carriage 37. In this case also, OP may be transferred by another printer.

Figure 9C:
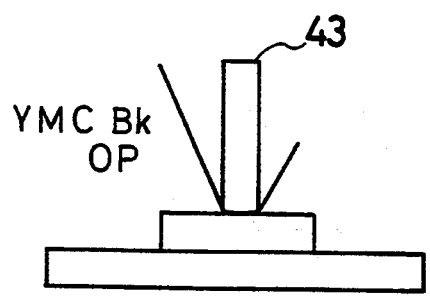

It is also possible to transfer Y, M, C, Bk and OP with a single head 43, as shown in FIG. 9(c).

Figure 10A:
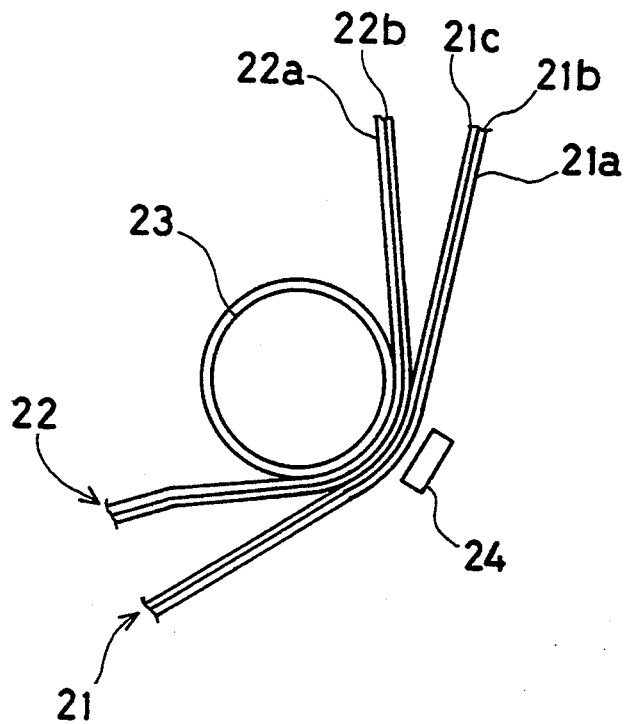
FIGS. 10a & 10b illustrate a transfer method.

FIG. 10(a) shows a transfer mechanism which may be used for the sublimation transfer method.

A transfer film 21 comprises a heat-resistant lubricant layer 21a, a transfer base material 21b and a sublimation transfer layer 21c, which are stacked up with a primer interposed so as to enhance the bonding of the coating material to the substrate. The transfer film 21 may be a film which has been subjected to easy-adhesion treatment. The heat-resistant lubricant layer 21a comprises a mixture of polyvinyl butyral, polyisocyanate and phosphate. The transfer base material 21b comprises polyethylene terephthalate, polyimide, etc. The sublimation transfer layer 21c comprises a sublimation dye, e.g., an indoaniline, pyrazolone or azo dye, and a binder, e.g., a polyvinyl acetal or cellulose binder.

Image receiving paper 22 comprises an image receiving paper base material 22a and an image receiving layer 22b which is laminated thereover with a primer interposed therebetween. The image receiving layer 22b comprises saturated polyester, vinyl chloride, etc. The base material 22a comprises synthetic paper, foamed polyester, foamed polypropylene, etc., and the reverse layer a binder, lubricant, coating material, etc.

The vinyl chloride resin material itself may be formed as a receptor layer.

The image receiving paper 23 is wound around a platen roll 23, and the transfer film 21 is laid on the paper 23 in close contact therewith. In this state, a thermal head 24 is brought into contact with the back surface of the transfer film 21 to heat it, thereby causing migration of the sublimation transfer dye so that it adheres to the image receiving layer 22b to dye the same. With the sublimation transfer apparatus, an amount of dye which corresponds to the heat energy applied migrates to the image receiving layer and it is therefore possible to effect recording with a gradation corresponding to the heat energy for each pixel dot.

Figure 10B:
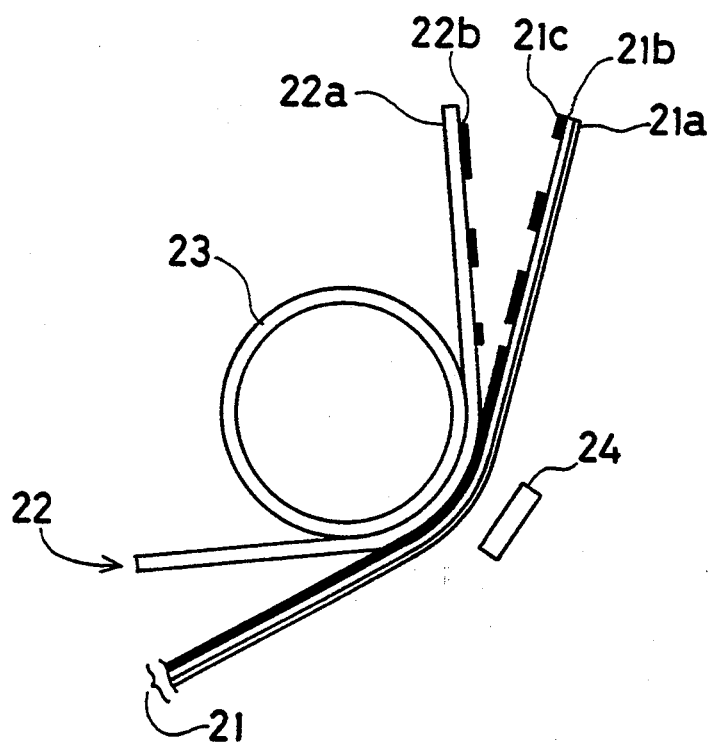

In thermal transfer, with plain paper 22 set between rubber roll 23 and a transfer film 21, the transfer film is heated in accordance with image data with a thermal head 24, as shown in FIG. 10(b). In consequence, a thermal transfer layer (wax) coated on the transfer base film 21b is fused when the heat energy applied exceeds a predetermined value, and it is transferred to the plain paper 22. When the heat energy applied is not higher than the predetermined value, the thermal transfer layer is not transferred. In this case, recording is effected in binary expression in pixel dot units. When gradational expression is made in this recording method, the ratio of the number of recording dots to the number of dots constituting each pixel is controlled.

Accordingly, when the photographic image is recorded by the sublimation transfer method and the character information or the like by the thermal transfer method, the image processing controller 2 shown in FIG. 1 should be arranged to effect control such that the quantity of energy applied to the head by the driver 4 in the case of gradational information such as an identification photograph is different from that in the case of non-gradational information such as symbols.

Although the transfer mechanism has been described by way of a roll type transfer apparatus that employs a platen roll such as those shown in FIGS. 10(a) and 10(b), the same transfer mechanism similarly applies in the case of a flat type that employs the carriage 37 and the end face type thermal head, such as those shown in FIGS. 10(a) and 10(b).

If the card employed has sufficient flexibility as in the case of a PET card (described later), transfer can be effected with a roll type transfer apparatus. However, for cards that lack flexibility, for example, vinyl chloride cards, a flat type transfer apparatus is suitably employed.

Figure 11:
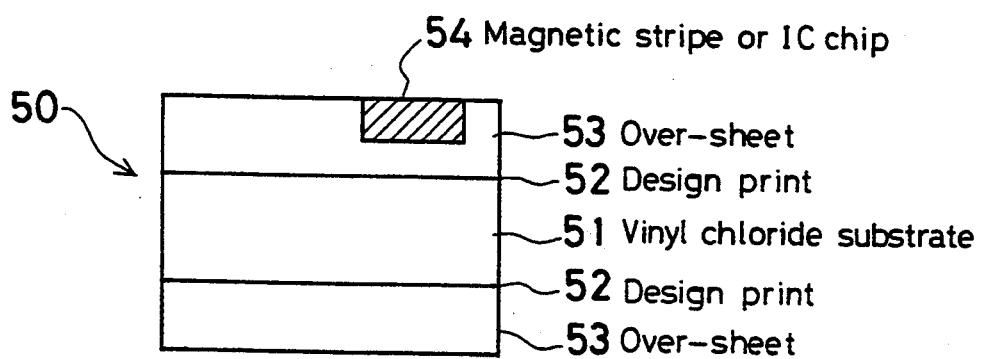
FIG. 11 shows the arrangement of a vinyl chloride card.

FIG. 11 shows the arrangement of a vinyl chloride card.

Fixed information, for example, a design, company's mark, etc. is printed on both surfaces of a vinyl chloride substrate 51, and an over-sheet 53 is laminated on each surface. On this card, transfer is effected by the above-described method. When a magnetic stripe or IC chip 54 needs to be provided, it is buried in the over-sheet 53. The thickness of the card is on the order of 0.2 to 1.0 mm.

Figure 12:
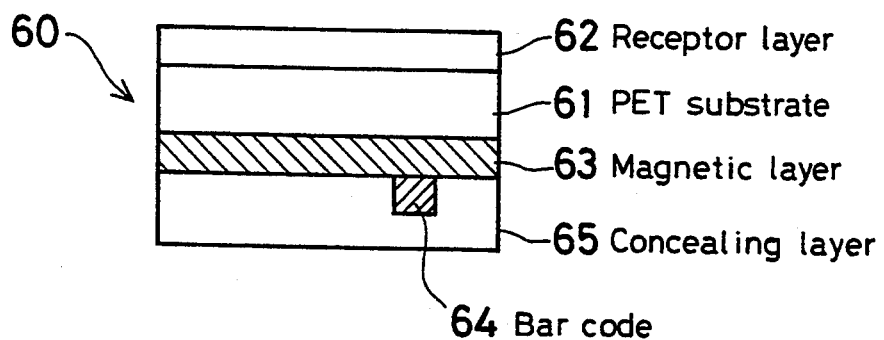
FIG. 12 shows the arrangement of a PET card.

FIG. 12 shows the arrangement of a PET card.

An image receiving layer 62 is laminated on a PET substrate 61, and the above-described transfer is effected on the image receiving layer 62. The other surface of the substrate 61 is provided with, for example, a magnetic layer 63, a bar code 64 and a concealing layer 65 which is provided over the bar code 64 to conceal it to thereby ensure the security. The bar code 64 is adapted to be machine readable, as a matter of course. The thickness of the PET card is, in general, on the order of 190 to 280 μ.

Paper or synthetic paper cards may also be employed in addition to the above-described plastic, ABS and polycarbonate cards.

Figure 13:
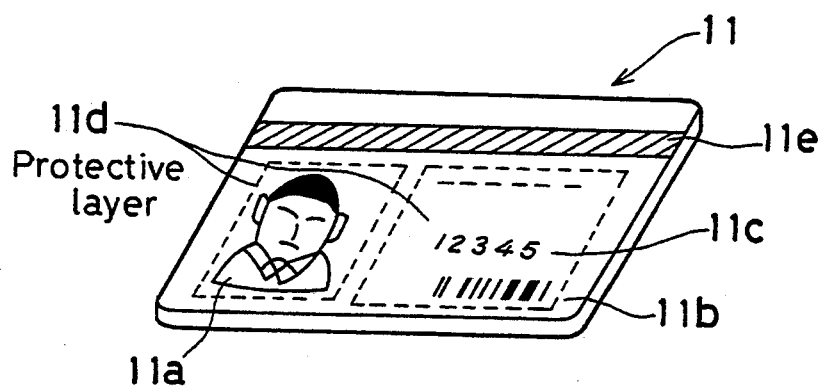
FIG. 13 shows an ID card.

Thus, it is possible to readily make an ID card with an identification photograph 11a as a full-color image and with a bar code 11b and code information 11c, e.g., name, employee number, etc., as black and white images, as shown in FIG. 13. The card 11 shown in the figure has protective layers 11d which are provided over the recording regions for the identification photograph 11a and the code information 11c. Reference numeral 11e denotes a magnetic stripe.

Figure 14:
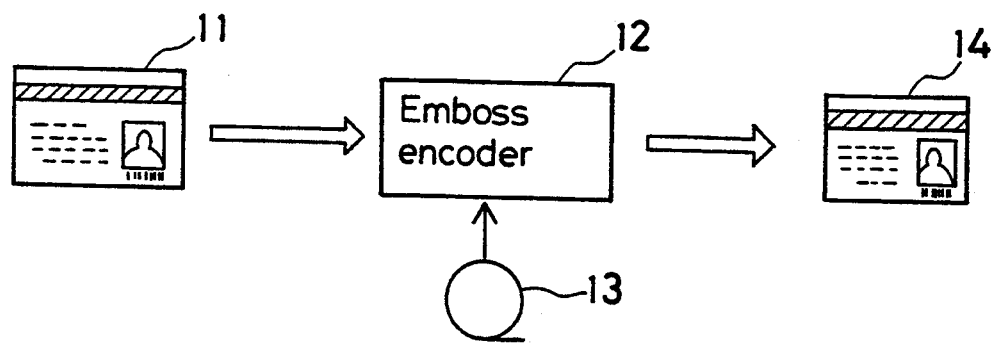
FIG. 14 illustrates emboss/encode processing.

The card 11 made in this way is embossed (emboss encode processing) with characters in a desired region by an emboss encoder 12, thereby completing an ID card, as shown in FIG. 14. To apply the emboss encode processing to the card 11, the photograph and the emboss encode data must coincide with each other. In the present invention, therefore, emboss encode information has also previously been assigned as attribute data, as shown in FIG. 2(a), so that the photograph and the emboss encode information are matched with each other on the basis of the coordinate information. The encode information is written into a magnetic stripe formed on the card or into an IC that is buried in the card.

Figure 15:
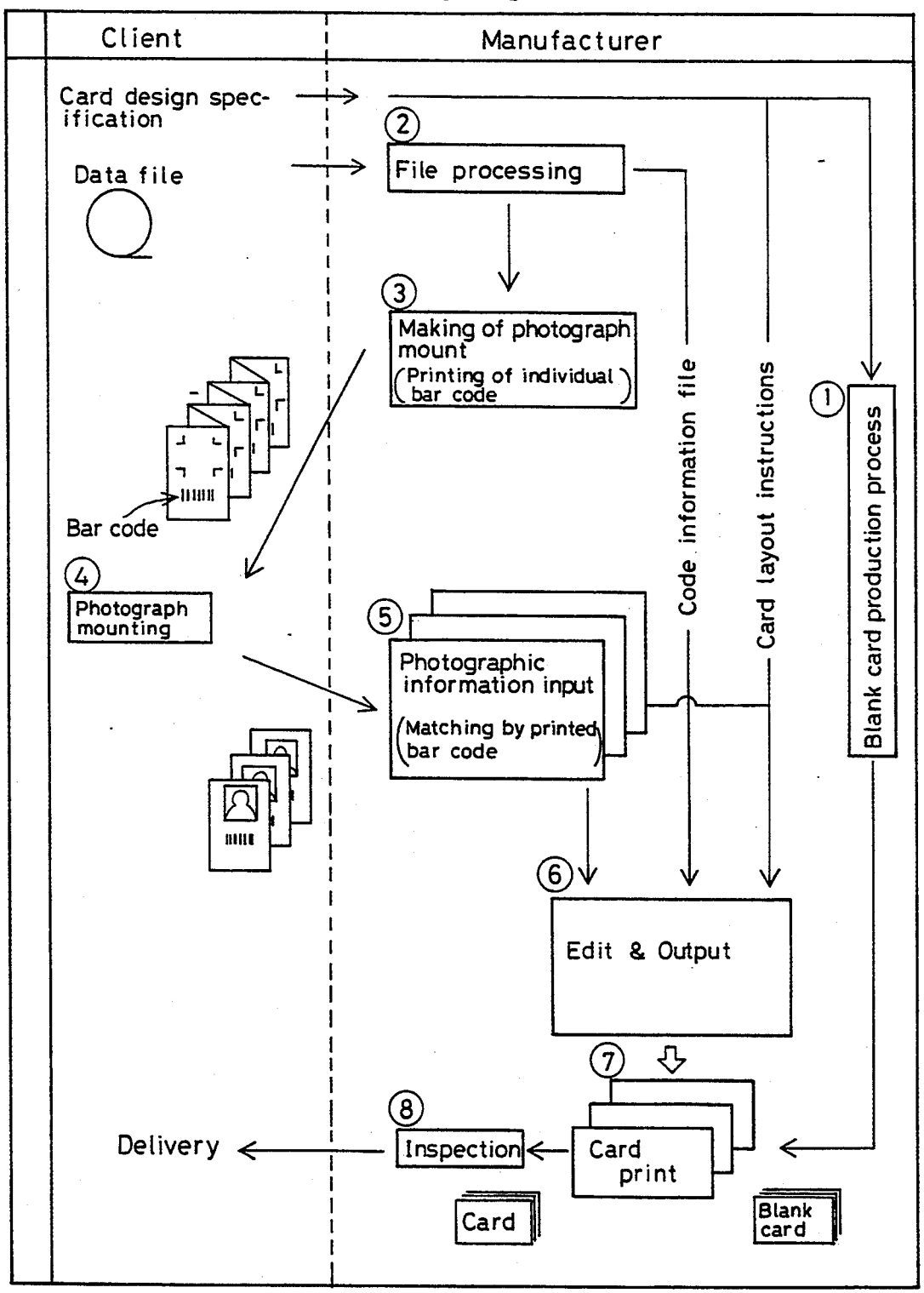
FIG. 15 shows an ID card making process.

The ID card making process according to the present invention will next be explained with reference to FIG. 15.

First, blank cards are produced according to a card design specification accepted from a client (Step 1). In this step, fixed information, e.g., a design, company's mark, etc., is printed. At the same time, card layout instructions are prepared and sent to an editing step 6. In addition, a file processing is executed on the basis of a code information file, e.g., MT (Magnetic Tape), from the client, and pieces of coordinate information are formed into bar codes and printed out by use of a printer, thereby making photograph mounts (Step 3). Next, a photograph is attached to a designated position on each photograph mount and then read by use, for example, of a CCD scanner, and the character and code information and the photographic information are matched with each other by use of each individual bar code (Step 5). Then, editing is effected on the basis of the photographic information, character and code information and card layout information (Step 6), and recording is effected on blank cards (Step 7). The recorded cards are delivered to the client via an inspection Step 8. The emboss encode processing may be executed in Step 7.

Thus, a plurality of different kinds of information, for example, photographic image information and attribute information, e.g., name, date of birth, etc., are input in the form of bar codes such that these pieces of information can be coordinated with each other, and the pieces of information are matched with each other with reference to coordinate information such as bar codes. Accordingly, ID cards of good quality can be made accurately and efficiently. It is also possible to record gradational image information such as identification photographs in the form of full-color images by the sublimation transfer method and record names, symbols and so forth in the form of black and white images by the thermal transfer method. The processing can be effected directly on a substrate, and no post-processing is needed. Since recording can be effected through editing process, it is possible to completely match each individual identification photograph, code information, e.g., name, post, ID number, etc., magnetic stripe recording information and emboss information. If the processing is effected on plastic cards, the resulting cards can be used for money transactions. Since image information that has once been input is stored in a recording medium, for example, an optical disk, the processing that is executed to reissue cards is simplified, and the enlargement and reduction of the photographs are easy. Since code information and identification photographs can be mechanically matched with each other, these two different kinds of information can be readily processed even in random order.

Next, one embodiment wherein forgery prevention processing is applied will be explained with reference to FIGS. 16(a)-(f) and FIGS. 17 and 18.

When an ID card is issued with photographic image data and attribute data being coordinated with each other, as described above, forgery prevention information such as that shown in FIGS. 16(a)-(f) is input.

Figure 16A:
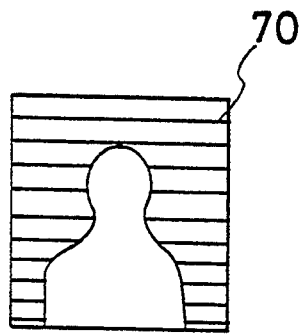
FIGS. 16a, 16b, 16c, 16d, 16e and 16f show examples of forgery prevention information.
Figure 16B:
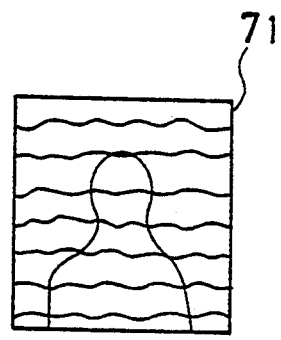
Figure 16C:
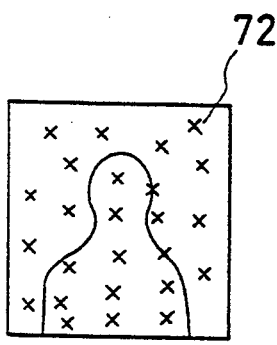
Figure 16D:
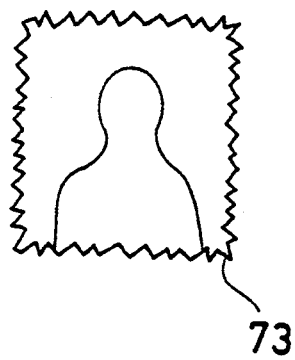
Figure 16E:
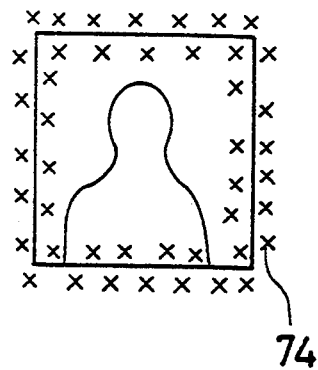
Figure 16F:
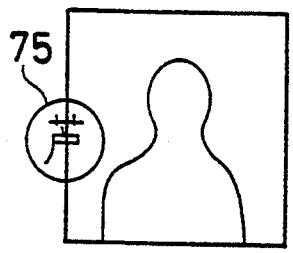

Examples of forgery prevention information usable in the present invention include complicated image patterns which are superposed on identification photograph information, and forgery prevention information which is added to the boundary of identification photograph information, such as parallel lines 70 that are inserted in the background of the identification photograph (see FIG. 16(a)), wave lines 71 that are inserted in the whole identification photograph (see FIG. 16(b)), logo marks 72 that are inserted in the identification photograph (see FIG. 16(c)), notches 73 that are made along the edges of the identification photograph as in the case of a postage stamp (see FIG. 16(d)), an image pattern 74 that is inserted in the form of a frame in the boundary region between the identification photograph and the card substrate (see FIG. 16(e)), and a tally seal 75 that is put on the identification photograph (see FIG. 16(f)). It is difficult with conventional techniques to imitate the processing of photographs having parallel lines, wave lines, logo marks, etc. added thereto. In order to forge a photograph output with notched edges, it is necessary to notch the edges of a false photograph, which is practically impossible. Examples of the way of preparing such forgery prevention information include a method wherein a specific pattern is input in conversation with the display screen by use of a mouse 4, a method wherein an original having a tally seal or logo recorded thereon is photographed with a CCD scanner or a video camera to thereby input the seal or logo, and a method wherein a specific pattern, e.g., parallel lines, wave lines, notches, etc., is generated by computation in an image processing controller. Any of the above methods may be employed. It is also possible to encode an individual ID number or the like and output it on the identification photograph in the form of a pattern when the editing is executed simultaneously with attribute information. When the identification photograph information, attribute information, layout information and forgery prevention information are input in this way, attribute information is read out from the individual data file stored, and this is checked against the bar code read together with the photographic information, thereby matching the attribute information and the photographic information. Further, the forgery prevention information and the photographic information are combined together, and the resulting composite information is printed out onto a card substrate.

In the case where the tally seal 75 is put on the identification photograph, if it is printed on a card simultaneously with the printing of a pattern, it is possible to satisfactorily recognize the tally seal 75 even if a photograph is superposed thereon by a sublimation transfer printer since the sublimation transfer dye has high transparency.

Figure 17:
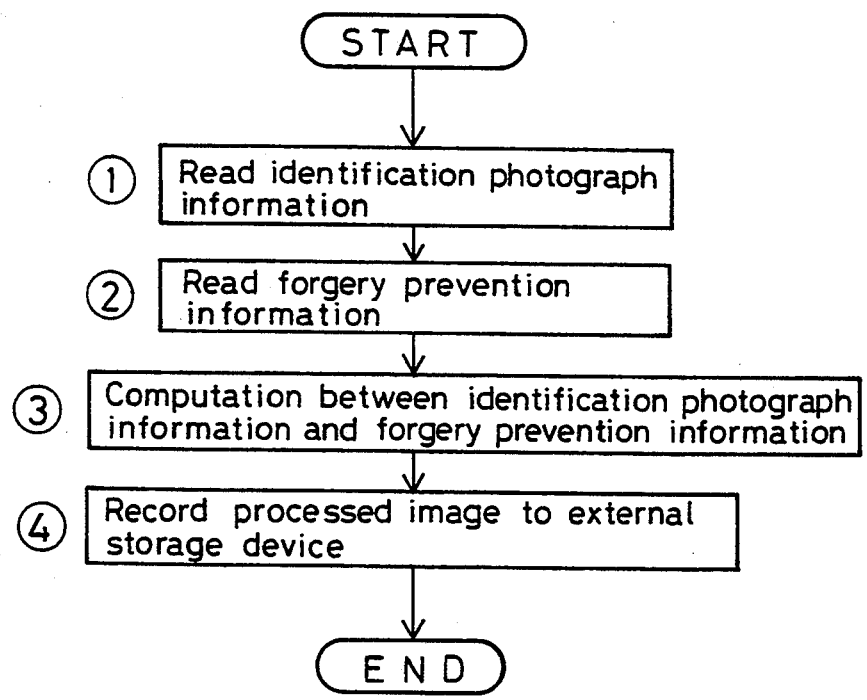
FIG. 17 illustrates the flow of forgery prevention processing.

The forgery prevention processing is executed by carrying out steps such as those shown in FIG. 17.

First, identification photograph information is read out (Step 1). In this step, identification photograph information that is input by an identification photograph input means, e.g., a CCD scanner or a video camera, is read out onto a memory in an image processing controller. The identification photograph information is color raster data for three colors, i.e., R, G and B, for example. Each color data comprises 8 bits to provide 256 gradation scales. Next, forgery prevention information is read out (Step 2). In this step, the forgery prevention information previously prepared is read out onto the memory in the image processing controller. The forgery prevention information also represents three colors, i.e., R, G and B. Each color data comprises 8 bits to provide 256 gradation scales in the same way as in the case of the identification photograph information. For the identification photograph and forgery prevention information read out, computation is executed for each pair of corresponding pixels in the two different kinds of information to apply the forgery prevention processing to the identification photograph information. The computation between the two different kinds of information is performed according to the following equation:

$$X(i,j) = a \times A(i,j) + b \times B(i,j)$$

where $X(i,j)$ is the gradation value of one pixel in the i-th row, the j-th column of an image having been subjected to the forgery prevention processing, $A(i,j)$ is the gradation value of one pixel in the i-th row, the j-th column of the identification photograph information, $B(i,j)$ is the gradation value of one pixel in the i-th row, the j-th column of the forgery prevention information, and a and b are coefficients for the forgery prevention processing.

By properly selecting a combination of the forgery prevention processing coefficients a and b, the density is controlled such that the image pattern is whited out or blackened, or the colors of the identification photograph information and the image pattern are mixed together.

For example, when black wave lines are to be inserted in the whole identification photograph information, a and b are set to 1 and −1, i.e., a=1 and b=−1, and computation is performed between the identification photograph information and the forgery prevention information, in which data of B=255 has been stored for wave line portions and data of B=0 for non-wave line portions.

Then, the following conditions are set:

$$a \times A(i,j) + b \times B(i,j) < 0 \rightarrow X(i,j) = 0$$

$$a \times A(i,j) + b \times B(i,j) > 255 \rightarrow X(i,j) = 255$$

Thus, for the wave line portions, $X(i,j)=0$, whereas, for the non-wave line portions, $X(i,j)=a \times A(i,j)$. That is, the original gradation values are obtained. Therefore, if this processing is executed for all the pixels for each color, black wave lines will appear on the identification photograph information. When it is desired to insert black lines only in the background of the identification photograph, the contour of the face is designated on the display to cut it out, and with b=0 being set for the inside of the contour, the same processing as the above is executed. When it is desired to insert color wave lines, the above computation is performed for each of the three colors, i.e., R, G and B. If a and b are used as a function of position, it is possible to add a forgery prevention pattern which varies in density with position. Next, the processed image is recorded to an external storage device in Step 4. In this case, since the amount of information is large, the processed data is written to an optical disk or other similar external storage device. When the processed image need not particularly be stored, the data may be output directly from a printer, as a matter of course.

Figure 18:
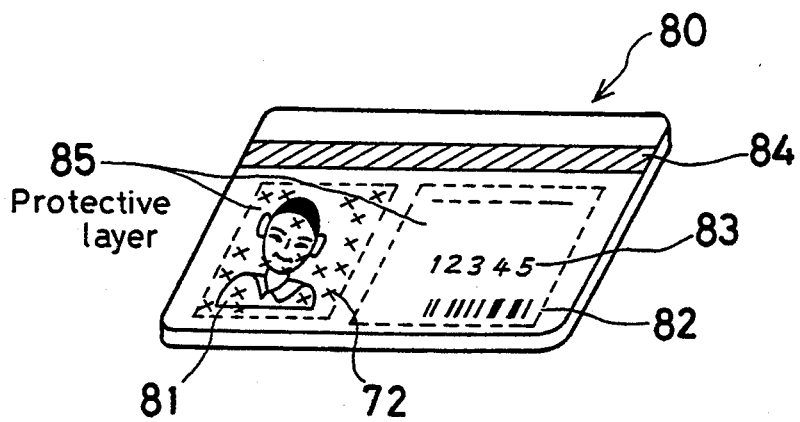
FIG. 18 shows a finished ID card.

FIG. 18 shows a printed card 80. Logo marks 72 are added to an identification photograph 81, and a bar code 82 and a magnetic stripe 84 are additionally provided. Further, an identification photograph region and an attribute information region 83 are provided with respective cover films 85 as protective films, thus completing the making of an ID card.

Since various image patterns can be combined with identification photograph information by the image processing, forgery prevention can be contrived by printing out a complicated pattern onto an identification photograph. Since the forgery prevention processing can be executed at the same time as the image editing is effected, it is possible to reduce the loss of time and cost due to the forgery prevention processing. Since the forgery prevention processing can be carried out only by the combination of an image editing processor and a printer, such as those shown in FIG. 1, the ID cards can be improved in security.

Next, embodiments in which an identification photograph and a card substrate are embossed with type will be explained with reference to FIGS. 19(a)-(b), 20(a)-(b) and 21(a)-(b).

FIGS. 19(a)-(b) show one embodiment in which type is embossed to extend over an identification photograph and a card substrate. FIG. 19(a) is a perspective view, and FIG. 19(b) a sectional view. In the figures, reference numeral 91 denotes embossed type, 94 an identification photograph, 95 irregularities, 96 a magnetic stripe, 100, 101 and 102 card substrate layers, and 103 a protective layer.

The card that is shown in FIGS. 19(a)-(b) is a plastic card of credit card size which comprises vinyl chloride or polyester as the main component. The card is formed by successively laminating card substrate layers 100, 101 and 102, burying an identification photograph 4 in a hole formed in the substrate layer 102, and providing a protective layer 103 thereon. In addition, specific type 91 is formed to extend over the identification photograph 94 and the card substrate by emboss processing. To falsify a card embossed with specific type as in the above, the protective layer 103 would be peeled to replace the identification photograph 94 with another. In such a case, however, since the surface of the substrate layer 101 where the identification photograph 94 is placed has irregularities 95 formed by the emboss processing, the false identification photograph would rise at a portion thereof which coincides with the irregularities 95, so that it is difficult to replace the identification photograph 94 with another. Even if a wicked individual contrives to emboss the false photograph with irregularities which are similar to the irregularities 95, it is extremely difficult with conventional techniques to provide irregularities which are coincident with the irregularities 95 in the card substrate, and it is therefore possible to prevent falsification. If embossed characters of originality which cannot readily be imitated, for example, original type, log mark or the like, are used, it becomes even more difficult to falsify the card and hence possible to improve the card in security.

Figure 20:
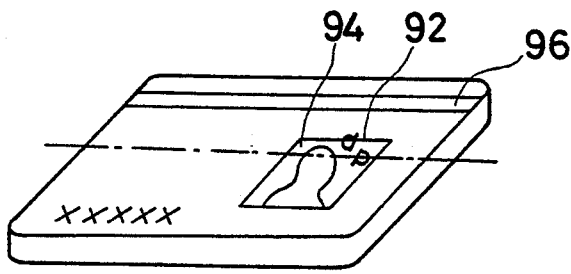
FIGS. 20a & 20b show one embodiment in which type is embossed on an identification photograph.
Figure 20:
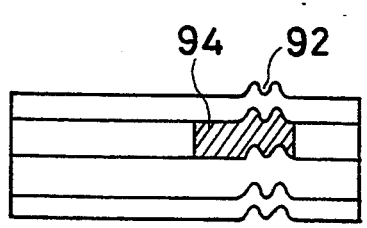
Figure 21:
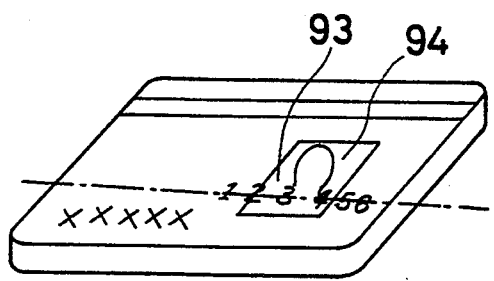
FIGS. 21a & 21b show one embodiment in which an embossed pattern is diverted to the prevention of falsification.
Figure 21:
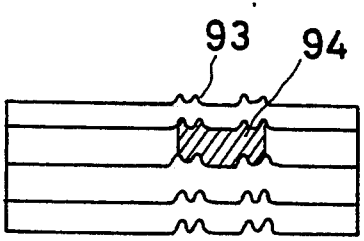

FIGS. 20(a)-(b) show another embodiment in which type is embossed on the identification photograph. FIG. 20(a) is a perspective view, and FIG. 20(b) a sectional view.

Figure 19:
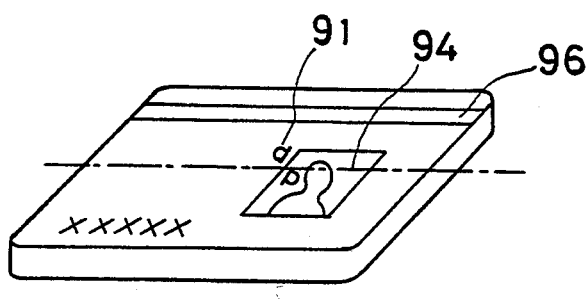
FIGS. 19a & 19b show one embodiment in which type is embossed over an identification photograph and a card substrate.
Figure 19:
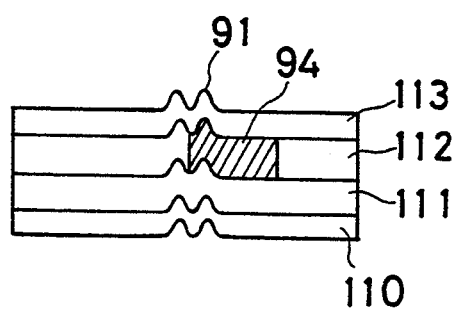

In this embodiment, emboss processing is applied to the photograph, so that it is difficult to replace the photograph with another and hence possible to prevent falsification in the same way as in the case of FIG. 19.

FIGS. 21(a)-(b) show still another embodiment in which a conventional embossed pattern is diverted to the prevention of falsification. FIG. 21(a) is a perspective view, and FIG. 21(b) a sectional view.

In this embodiment, an identification photograph is buried in a position where, obviously, embossed characters are to be provided, such as characters for visual expression, for example, characters for journal or ID number, which are embossed in an imprinter, thereby using such conventional embossed characters for the prevention of falsification. By embossing Arabic numerals 93, which are usually used, as illustrated, it is possible to apply falsification prevention processing simultaneously with the conventional emboss processing without the need for any special processing. Thus, the same advantages as those in the case of FIGS. 19(a)-(b) and 20(a)-(b) can be obtained.

Although in the embodiments shown in FIGS. 19(a)-(b), 20(a)-(b) and 21(a-(b) the emboss processing is applied directly to the photograph, the photographic image that is formed by the system shown in FIG. 1 can be similarly made effective to prevent falsification. That is, if the photograph image formed by the system shown in FIG. 1 is removed, for example, by scraping the photograph portion of the card, irregularities are inevitably left, and once the card is marked with such irregularities, no sublimation transfer dye will stick thereto effectively. In addition, any desired number of embossed characters may be provided, and there is no particular restriction on the position where characters are embossed. However, it is desired to provide embossed characters at a position where an ordinary embossed pattern such as an ID number is not interfered with. When the card is provided with a magnetic stripe 96, it is desired to provide embossed characters at a position which is at a certain distance from the magnetic stripe 96 so as not to interfere with reading of magnetic data.

Since irregularities are formed on the card by embossing as described above, it is difficult to replace the identification photograph with another or print out a photographic image thereon and it is possible to make virtually impossible to falsify the card. The use of original type or mark as an embossed character makes the forgery prevention further more effective and enables an improvement in the security of the card. In addition, falsification prevention processing can be applied simultaneously with the formation of a conventional embossed pattern simply by selecting a proper emboss position without the need for any special processing.

Figure 22:
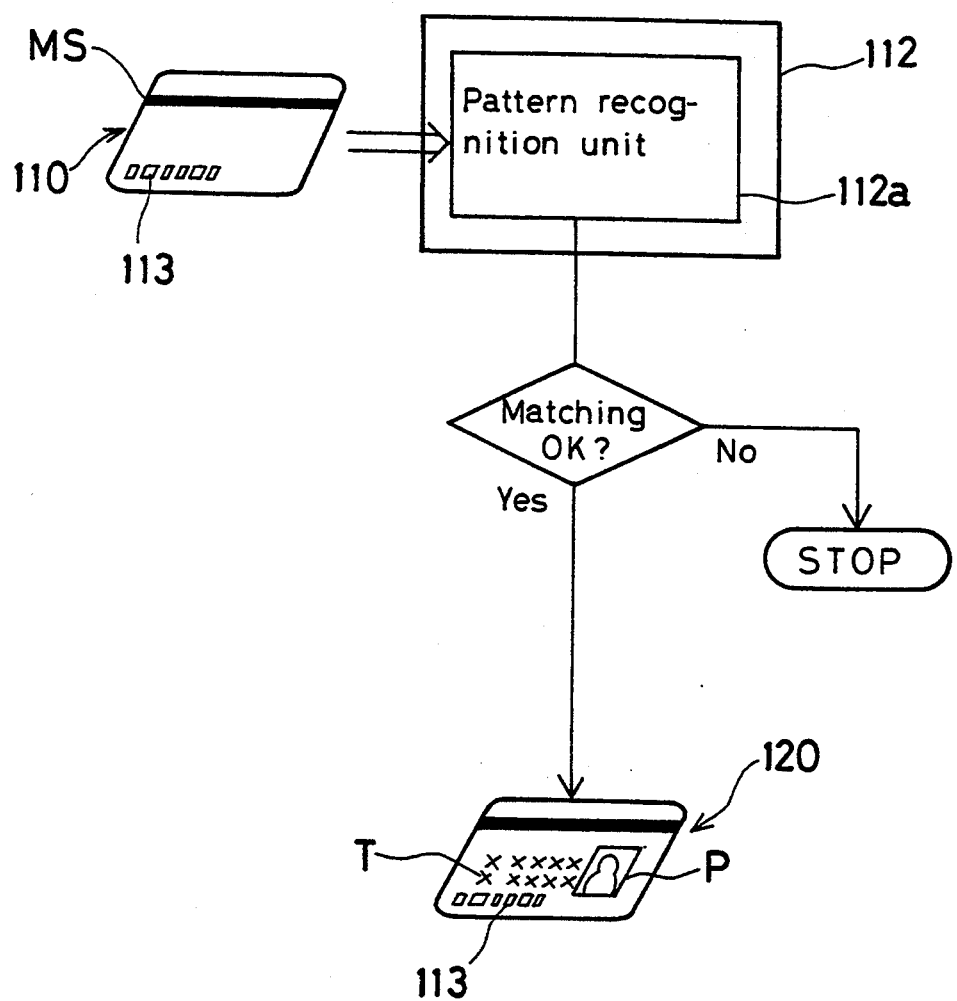
FIG. 22 illustrates an ID card issuing system.

FIG. 22 illustrates one embodiment which is designed to prevent the making of forged cards and the undesired issue of cards which are not conformable to the production purpose.

A blank card 110 that is delivered from the card production process is provided with a magnetic stripe MS and further provided with a special pattern 113 in the form, for example, of a fluorescent pattern or a transparent bar code. A card processing machine 112 incorporates a pattern recognition unit 112a which is operated to recognize the special pattern 113 exclusively by setting a specifying code, in addition to means which are needed to effect print processing of image data and attribute data for the blank card 110, such as a transport device, a printer, etc. The pattern recognition unit 112a has a judging function for recognizing the special pattern 113 provided on the blank card 110 and checks the blank card 110 inserted therein as for the matching concerning the special pattern 113, so that only a blank card 110 that is judged to be "OK" is printed with an identification photograph P, attribute information T, etc., whereas a blank card that is judged to be "NO" is removed by stopping the operation.

To enable the special pattern 113 to be recognized in the pattern recognition unit 112a by specifying it, a specifying code is set to the card processing machine 112. Specifying of the special pattern 113 by the pattern recognition unit 112a can be changed by use of the specifying code. For example, with regard to a blank card that is provided with another special pattern, a specifying code for recognition of it can be set according to need. Since the special pattern 113 relating to the blank card 110 is, in general, provided to differ for each lot, in actuality not a single blank card but a plurality of blank cards are prepared and continuously subjected to print processing in the same lot.

If ID cards are issued by the card processing machine 112 in the described manner, the following advantages are obtained: The card processing machine 112 selects only a blank card 110 that is provided with a special pattern 113, for example, as shown in FIG. 22, as a limited object while removing blank cards provided with a pattern other than the special pattern 113 or those which are not provided with the special pattern 113 by the operation of the pattern recognition unit 112a, and prints the blank card 110 with image data or character data such as an identification photograph P, attribute information T, etc., thereby issuing an ID card 120. Since in this method of issuing the ID card 120 the print processing is executed after the special pattern 113 on the blank card 110 has been checked in the card processing machine 112, it is possible to prevent the undesired issue of cards which are not conformable to the production purpose. In addition, since the special pattern provided on the blank card 110 is left as it is, it is possible to make it difficult to forge the issued ID card 120.

Thus, blank cards are grouped according to the lots and provided with special patterns which differ for each lot, and only the grouped blank cards of a specific lot are subjected to print processing in a card processing machine having a judging function which enables recognition for each special pattern by setting a specifying code. Accordingly, it is possible to completely prevent the undesired issue of cards which are not conformable to the production purpose and to issue ID cards which are extremely difficult to forge. In addition, when cards are to be issued in a large quantity, blank cards which are to be printed can be limited by setting a specifying code for each card processing machine. It is therefore possible to simultaneously issue various kinds of ID card speedily and accurately while eliminating the interchangeability between the card processing machines.

Industrial Applicability

The ID card issuing system of the present invention is very effectively used to make efficiently ID cards which contain full-color images and have high security, and it can be utilized to issue ID cards not only in a large quantity but also in a small quantity.

What is claimed is:

1. An ID card issuing system for composing information on a card substrate, comprising:
    means for inputting respective primary information relating to first and second individuals, said primary information including associated coordination bar code information, and for separately inputting respective secondary information relating to said first and second individuals;
    means for identifying the respective primary information on the first and second individuals by the associated coordination bar code information, identifying the respective secondary information on said first and second individuals, and automatically pairing together the primary information and the secondary information relating to the same individual in accordance with commonality of identification;
    means for determining laid-out information on paired primary and secondary information relating to said individual; and
    means for outputting the laid-out information pertaining to said individual onto a card substrate.

2. A method for providing a gradation image and a non-gradation image on a card substrate for forming an ID card, the method comprising:
    (a) providing gradation image information that is characteristic of a given individual concurrently with coordination bar code information for the given individual within a first information storage that provides storage for gradation information on a plurality of individuals;
    (b) providing non-gradation image information concerning the given individual within a second information storage that provides storage for non-gradation image information on a plurality of individuals, said non-gradation information including coordination information in common with that encoded via the coordination bar code information of said gradation image information for the given individual;
    (c) automatically retrieving from the associated ones of the first information storage and second information storage one of said gradation image information and non-gradation image information for the given individual and then the other of said gradation image information and non-gradation image information for the given individual, said other information for the given individual being retrieved upon establishing a commonality between the coordination bar code information and the coordination information in said non-gradation information such that said gradation image information and non-gradation image information for the given individual are automatically paired together for placement on the same card substrate; and
    (d) outputting said gradation image information and said non-gradation image information for the given individual as paired onto said same card substrate.

3. A method according to claim 2, wherein at least one of steps (a) and (b) comprises storing respective image information concurrently with said coordination information.

4. A method according to claim 2, wherein at least one of steps (a) and (b) comprises obtaining said image information by electrooptically scanning a planar medium having the image information thereon.

5. A method according to claim 4, wherein the scanning also comprises cropping a desired region of said image information.

6. A method according to claim 2, wherein said outputting of step (d) comprises transferring said image information by sublimation or thermal transfer.

7. A method according to claim 2, further comprising the step of:
(e) transferring a protective layer over at least a part of the information outputted onto said card substrate.

8. A method according to claim 2, wherein the non-gradation information of step (b) includes emboss encoding information, and said method further comprises the step of:
(e) embossing said card substrate with said emboss encoding information.

9. A method according to claim 8, wherein said embossing is applied to said gradational image information.

10. A method according to claim 8, wherein step (e) comprises forming an original type or mark by said embossing.

11. A method according to claim 2, wherein the non-gradation image information of step (b) includes forgery prevention information, and step (d) further comprises providing forgery prevention processing of said card substrate at the same time as the outputting of said image information onto the card substrate.

12. A method according to claim 11, wherein said forgery prevention processing produces, according to said forgery prevention information, an image pattern on at least a part of a gradational image information region.

13. A method according to claim 12, wherein said image pattern comprises a linear pattern such as parallel lines, wave lines, oblique lines or chain lines.

14. A method according to claim 12, wherein said image pattern comprises a logo mark.

15. The method according to claim 12, wherein said image pattern comprises a character pattern.

16. A method according to claim 11, wherein said forgery processing produces, according to said forgery prevention information, notches in the edge portion of a gradational image information region.

17. A method according to claim 11, wherein said forgery processing produces, according to said forgery prevention information, a tally seal on at least a part of a boundary region between a gradational image information region and said card substrate.

18. A method according to claim 17, wherein said tally seal is printed simultaneously with the printing of a card pattern, and a gradational image is printed out by sublimation transfer so that a part of said tally seal overlaps said image.

19. An ID card issuing system according to claim 1, further comprising a card processing machine having means for pre-printing a special pattern on a blank card before printing, said special pattern differing for each lot, and means for effecting recognition for each special pattern according to a specifying code set therefor, so that information is printed out onto a blank card that is judged to be good by said card processing machine.

20. An ID card issuing system according to claim 1, further comprising means for storing at least one of the input information, the paired information and the laid-out information.

21. An ID card issuing system according to claim 1, wherein said input means is a plane scanning image input means.

22. An ID card issuing system according to claim 21, wherein said plane scanning image input means has a function of cropping a desired region.

23. An ID card issuing system according to claim 1, wherein said input means is a keyboard, a magnetic information reader or an optical information reader.

24. An ID card issuing system according to claim 1, wherein said identification and pairing means obtains matching between the different input information on the basis of coordinating information that is input in connection with each input information.

25. An ID card issuing system according to claim 1, wherein said output means comprises a sublimation transfer and/or thermal transfer printer.

26. An ID card issuing system according to claim 1, further comprising means for transferring a protective layer over a part or the whole area of the information formed on said card substrate.

27. An ID card issuing system according to claim 26, wherein the transfer of said protective layer is effected by use of a thermal head.

28. An ID card issuing system according to claim 1, further comprising emboss encode means, whereby emboss encode processing is carried out with matching obtained between different kinds of information on the basis of coordinating information.

29. An ID card issuing system according to claim 28, wherein said primary information includes a gradational image, and emboss processing is applied either on the gradational image or over the gradational image and said card substrate.

30. An ID card issuing system according to claim 28, wherein original type or mark is formed by said emboss processing.

31. An ID card issuing system according to claim 28, wherein said emboss processing is applied with a gradational image provided at a position where conventional emboss processing is applied.

32. An ID card issuing system according to claim 1, wherein forgery prevention information is additionally input, and forgery prevention processing is carried out at the same time as the laid-out information is output.

33. An ID card issuing system according to claim 32, wherein said primary information includes a gradational image, and said forgery prevention information is an image pattern which is drawn on at least a part of the gradational image region or a boundary region between the gradational image region and said card substrate.

34. An ID card issuing system according to claim 33, wherein said image pattern is a linear pattern selected from parallel lines, wave lines, oblique lines and chain lines.

35. An ID card issuing system according to claim 33, wherein said image pattern comprises a logo mark.

36. An ID card issuing system according to claim 33, wherein said image pattern comprises a character pattern.

37. An ID card issuing system according to claim 32, wherein said forgery prevention information makes notches in the edge portion of a gradational image region.

38. An ID card issuing system according to claim 32, wherein said forgery prevention information is a tally seal that is drawn on at least a part of a boundary region between a gradational image region and said card substrate.

39. An ID card issuing system according to claim 32, wherein a tally seal is printed simultaneously with the printing of a card pattern, and the gradational image is printed out by a sublimation transfer method so that a part of said tally seal overlaps said image.

40. An ID card issuing system according to claim 1, wherein said plurality of different kinds of information are gradational image information and non-gradational image information.

* * * * *